(No Model.) 6 Sheets—Sheet 1.

W. COWAN.
OSCILLATING LIQUID METER.

No. 355,592. Patented Jan. 4, 1887.

Witnesses.
Geo. H. Rea
Robert Everett.

Inventor:
William Cowan,
By James L. Norris
Atty.

(No Model.) 6 Sheets—Sheet 2.

W. COWAN.
OSCILLATING LIQUID METER.

No. 355,592. Patented Jan. 4, 1887.

Witnesses.
Geo. H. Rea
Robert Everett

Inventor.
William Cowan.
By James L. Norris.
Atty.

(No Model.) 6 Sheets—Sheet 3.

W. COWAN.
OSCILLATING LIQUID METER.

No. 355,592. Patented Jan. 4, 1887.

Witnesses.
Geo. H. Rea
Robert Everett,

Inventor.
William Cowan,
By James L. Norris.
Atty.

(No Model.) 6 Sheets—Sheet 4.
W. COWAN.
OSCILLATING LIQUID METER.

No. 355,592. Patented Jan. 4, 1887.

Witnesses
Geo. W. Rea
Robert Everett

Inventor:
William Cowan.
By James L. Norris.
Atty.

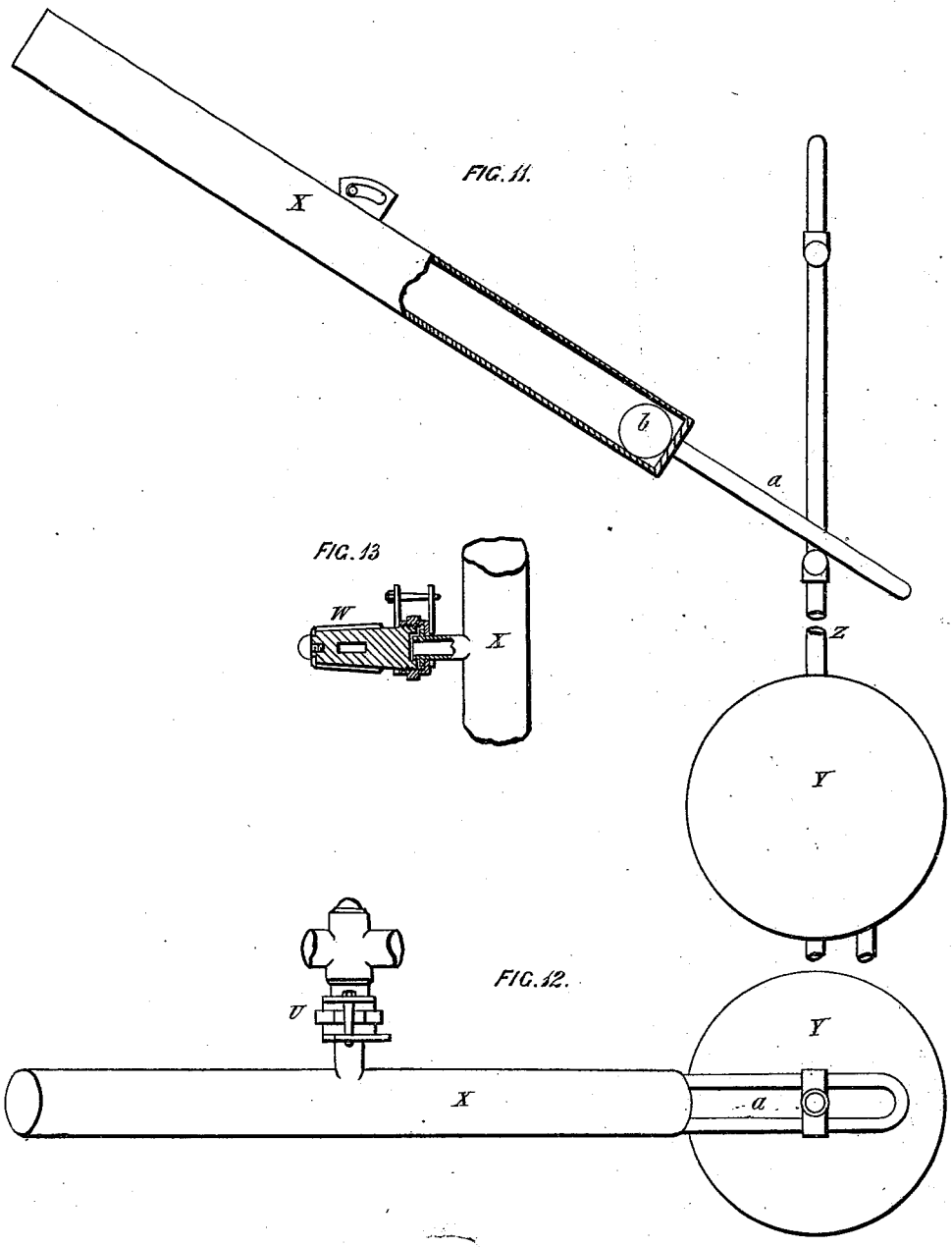

(No Model.) 6 Sheets—Sheet 6.

W. COWAN.
OSCILLATING LIQUID METER.

No. 355,592. Patented Jan. 4, 1887.

Witnesses.
Geo. W. Rea
Robert Everett.

Inventor.
William Cowan.
By James L. Norris.
Atty.

UNITED STATES PATENT OFFICE.

WILLIAM COWAN, OF EDINBURGH, SCOTLAND.

OSCILLATING LIQUID-METER.

SPECIFICATION forming part of Letters Patent No. 355,592, dated January 4, 1887.

Application filed July 26, 1886. Serial No. 209,147. (No model.)

*To all whom it may concern:*

Be it known that I, WILLIAM COWAN, of Edinburgh, Scotland, have invented new and useful Improvements in Apparatus for the Measurement of Liquids, of which the following is a description.

This invention has for its object the construction of liquid-meters, and in such a manner as to make them exceedingly simple and efficient and not open to many of the objections to which those at present in use are subject.

In order that the invention may be easily understood, drawings are attached hereto, of which the following is a description.

Figure 1:
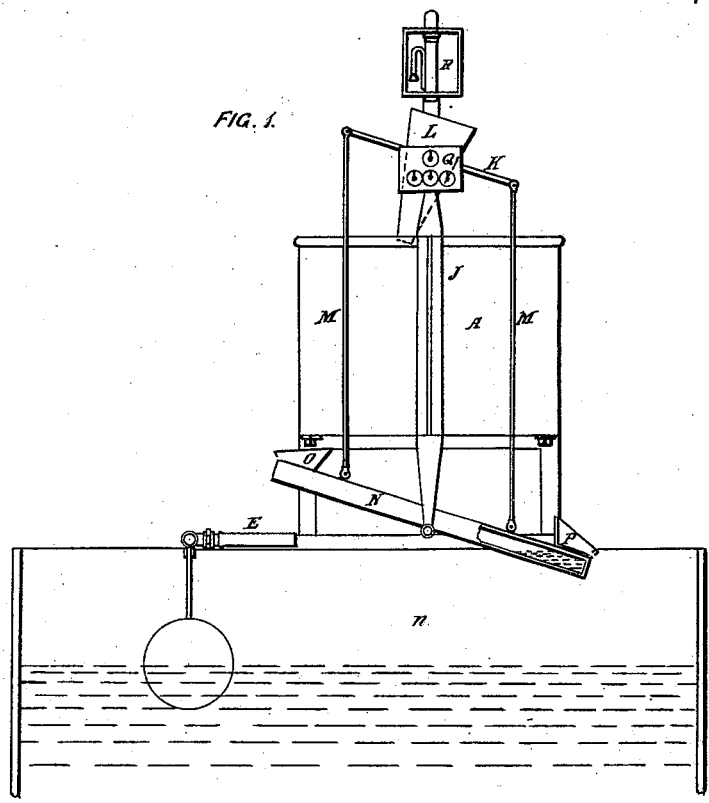
Figure 2:
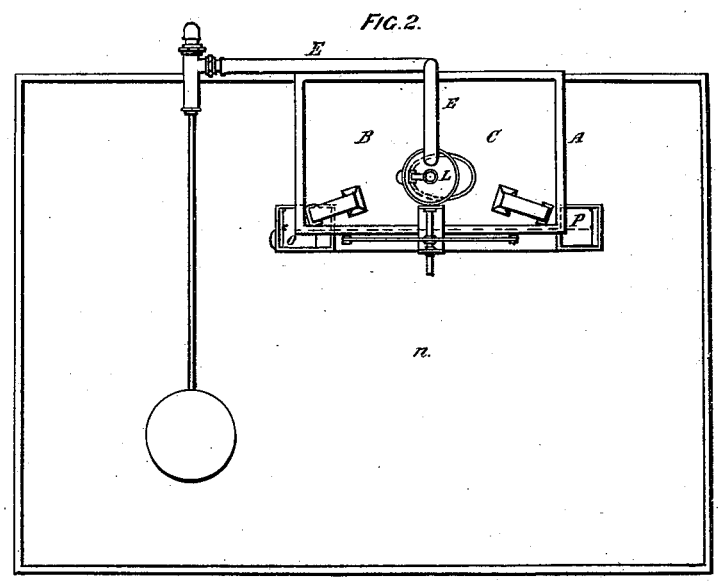
Figure 3:
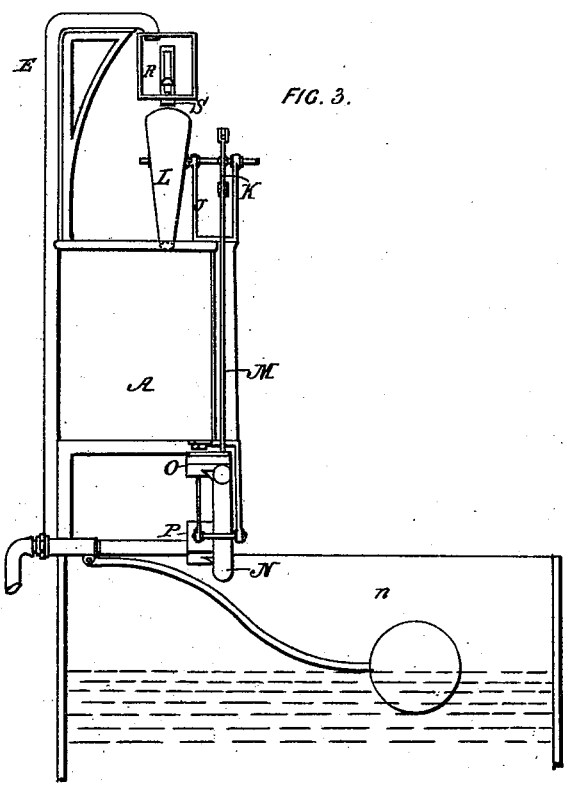
Figure 4:
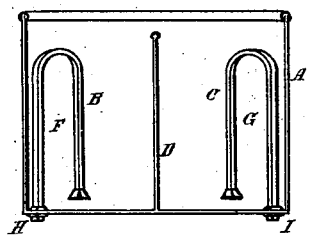
Figure 5:
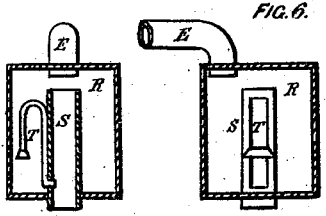
Figure 6:
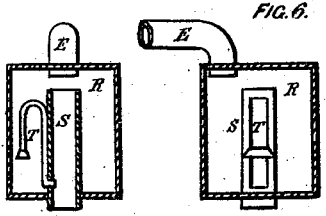
Figure 7:
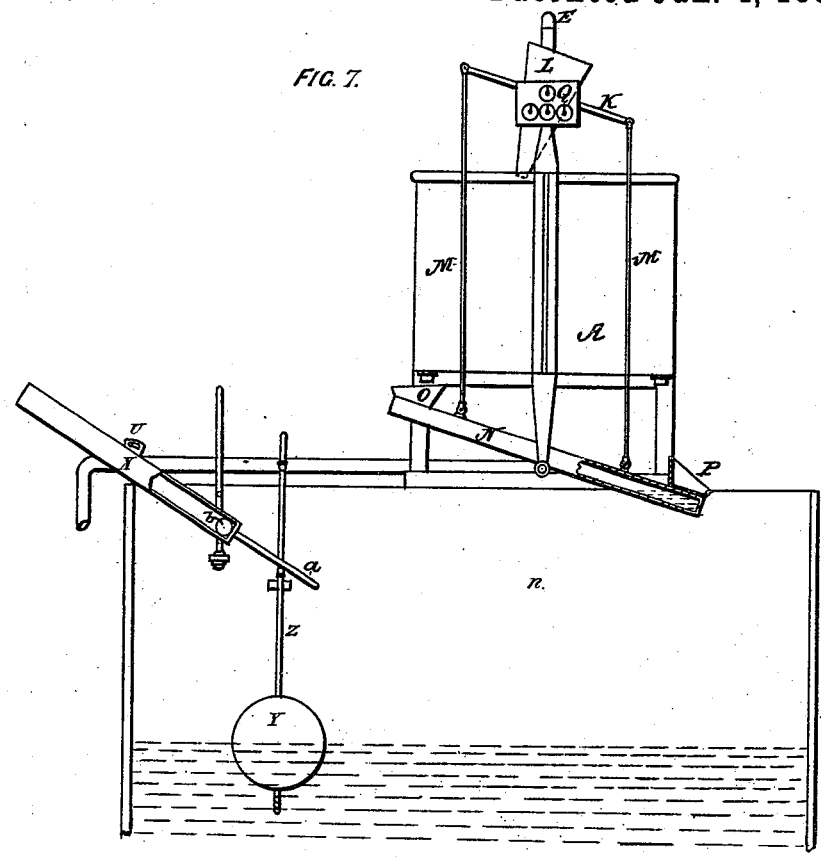
Figure 8:
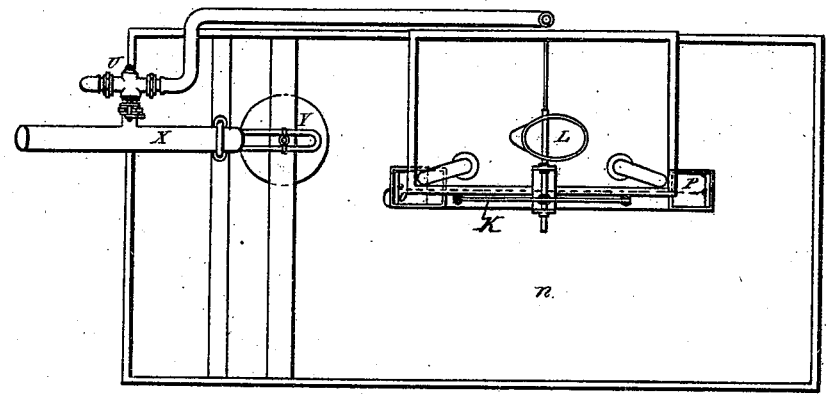
Figure 9:
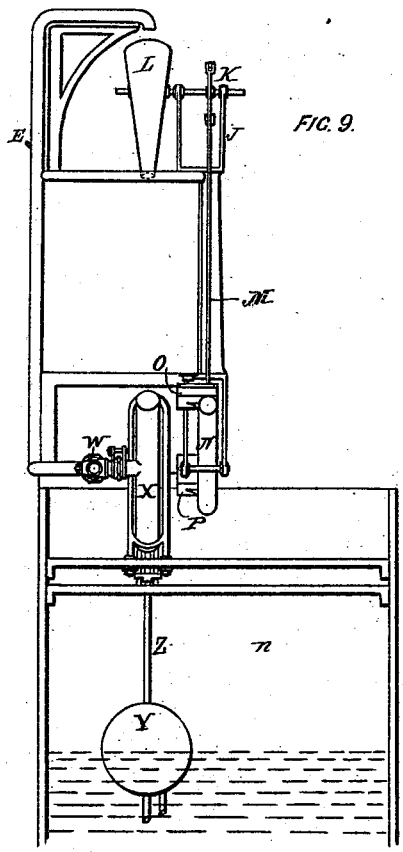
Figure 10:
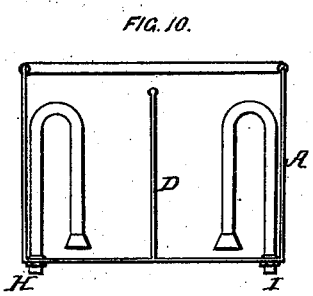
Figure 14:
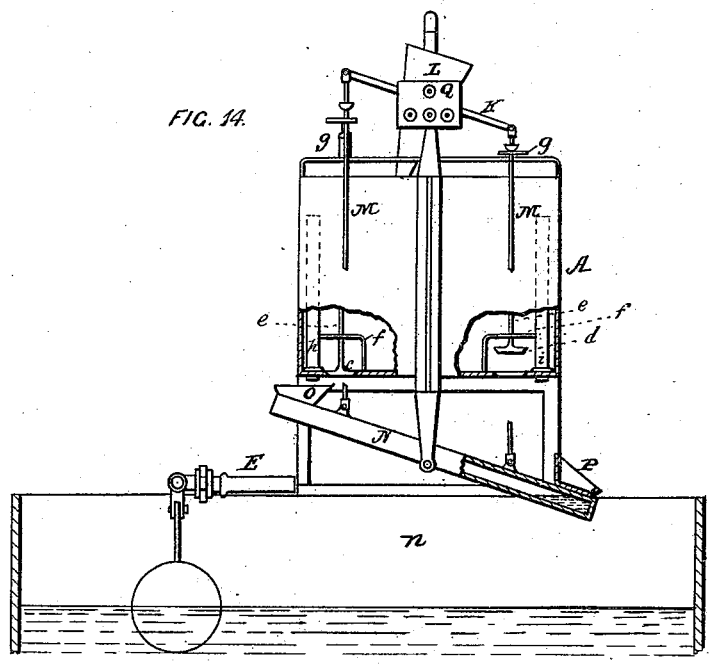
Figure 15:
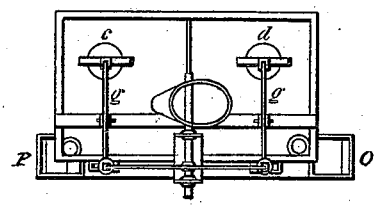
Figure 16:
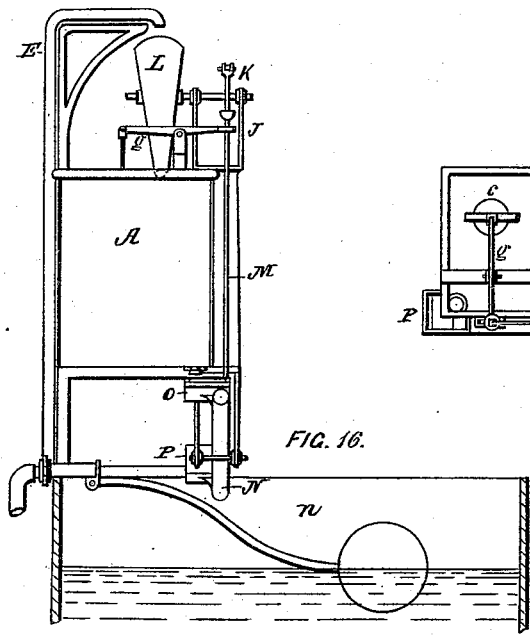

Figure 1 is a front elevation of the meter and cistern, the front of the latter being removed. Fig. 2 is a plan, and Fig. 3 a side elevation, of the same, the side of the cistern being removed. Fig. 4 is an elevation of the box or trough of the meter with its division-plate and flat-tube siphons, the front plate of the box having been removed. Fig. 5 is a front elevation, with the front plate removed, of an attachment to the water-supply pipe, and Fig. 6 is a side elevation of the same with the side plate taken away. The foregoing show the application of the meter to a cistern having the ordinary ball-cock arrangement for cutting off the supply. Fig. 7 is a front elevation of the meter and cistern, with the front of the latter removed, and shows the application of my improved loaded-beam ball-cock. Fig. 8 is a plan of it, and Fig. 9 a side elevation, with the side of the cistern removed, while Fig. 10 is a front elevation of the meter-box with the front plate removed, and exhibiting round-tube siphons. Fig. 11 is a side view of the loaded beam and ball; Fig. 12, a plan of it, and Fig. 13 some details of part of the beam and plug of the cock, the last three figures being drawn to a larger scale in order that the various parts may be seen more distinctly. Fig. 14 is a front elevation similar to Fig. 1, with parts of the front plate removed, and shows the contrivance adopted when valves are used instead of siphons. Fig. 15 is a plan of the trough or chambers in Fig. 14, and exhibits the arrangement of the levers used to operate upon the valves, while Fig. 16 is an end elevation of the parts shown in Fig. 14.

In all the views similar letters refer to the same parts.

I will first describe the arrangement when flat siphon-tubes are used, and an ordinary ball-cock, the siphons being made, preferably, flat, as shown in Fig. 4.

The invention then consists of a box or trough, A, Fig. 1, placed over a cistern, $n$, and is divided into two compartments, B and C, by a partition, D, as seen in Fig. 4.

E is the water-service supply-pipe.

Within each compartment of the box there is a flat-tube siphon, one marked F and the other G, Fig. 4. The short legs of the siphons terminate within the box, while the long legs end outside the box at H and I.

Above the box A there is pivoted to a suitable support, J, a beam, K, which carries a funnel-shaped pipe or conduit, L. At each extremity of the beam K a pivoted rod, M, depends. The lower ends of the rods are pivoted to a hollow beam, N, which works on an axis attached to the support J. On the upper part, and near each end of the beam N, there is a bucket, O and P, in each of which there is a small hole, and at Q there is an index or registering apparatus.

The action of the apparatus is exceedingly simple. When water flows from the service-pipe E, it falls into the funnel-shaped pipe or conduit L, and (in the position shown in the drawings, Fig. 1) is conducted into B, Fig. 4, when, on attaining a level corresponding with the top of the interior of the siphon F, the siphon is put in action, and the water escapes by the long leg at H and falls into the bucket O and into the cistern. The force and weight of the descending water entering the bucket cause the bucket to descend also, and as the hollow beam is loaded with either water, mercury, or a heavy metal ball, and the inclination of the beam becomes reversed, it will remain so until the opposite end is made to descend by the falling of water into the bucket at the other extremity. On the inclination of the beam being reversed the inclination of the funnel or conduit L becomes reversed also, thereby leading the supply of water into the chamber C. When the water has attained a proper height in this compartment, the same action as that previously described ensues, and this continues as long as water in any considerable stream flows from the supply-pipe, and as each vibration of the beam is communicated to the index Q a suitable register of the quantity passed is registered, the capacity of each chamber from the bottom of the short leg of the siphon to the top of the interior part of it having been constructed to contain a known quantity.

The foregoing answers all the requirements of a liquid-meter as long as there is any considerable stream of water flowing from the source of supply; but when the flow becomes very much reduced—to, say, that from a leaky tap, or a less quantity than the siphon can carry away in the same time—the siphons would not act with sufficient promptitude, and instead of a siphon action occurring a "stand-pipe" action would follow, and the dribble of water would pass through the siphon-pipe unregistered. To overcome this difficulty, I fix to the end of the supply-pipe a small box, R, Fig. 3. (Shown to a larger scale in Figs. 5 and 6.) In this case the water from the supply-pipe E falls into the box R, and as soon as it overflows the pipe S it falls into the conduit L and into one or other of the compartments of the box in the usual way; but when the quantity of water flowing from the service is reduced to a dribble it falls into the box R until it starts the small siphon T, when a sudden influx of water will pass down the pipe S into the conduit L and compartment B or C, as the case may be, and in sufficient quantity to bring the siphon action of F or G into use, when by the motion of the beam N the quantity of water will be registered.

Another way of meeting the difficulty of an insufficient flow of water to prevent non-registration is to affix to the supply-pipe a tap or cock capable of being opened or shut off suddenly when the water has risen or dropped to one or other of certain heights in the cistern. This I effect by fixing to the service-pipe a tap, U, Fig. 7, to the plug W of which is attached a hollow beam, X, (see Fig. 13,) that is raised or depressed by the float Y and rod Z, acting upon the slotted bar $a$ of the beam X. The details of the beam are seen better in Figs. 11, 12, and 13.

By the use of this apparatus before the water has attained such a height in the cistern as by the action of an ordinary ball-cock the supply would be reduced to a dribble the beam will become horizontal, and a very little additional water will disturb the level of the beam, which, being loaded by a movable weight, $b$, will suddenly alter its position and become depressed at the opposite end, and in so doing will shut off the tap promptly and completely. The ball-beam and tap may be so adjusted as to open or shut off the supply at any desired height of water in the cistern, and so admit of the use of round or annular siphons.

The mode of constructing the meter, when valves are used instead of siphons for emptying the compartments of the meter, is shown in Figs. 14, 15, and 16. In this case each compartment is furnished with a valve, one marked $c$ and the other $d$. Each valve has attached to it a rod, $e$, that works through a guide, $f$, and is suspended from one end of one of the cross-beams $g\,g$, the other end of which is raised or depressed by the action of the beam K.

Each chamber has a stand-pipe—one marked $h$ and the other $i$—the height of which is adjusted so that when water rises within the chamber to the top of the pipe the chamber will contain a known quantity. When the water has attained the height of the top of either stand-pipe, any additional water will flow down the inside of the stand-pipe and fall into the one or other of the buckets, which then becomes depressed, and in so doing raises the opposite end of the beam, and consequently opens the valve $d$ or $c$, as the case may be, when the water will escape and fall into the cistern below. On the other compartment becoming charged a similar action takes place, and thus, the chambers being of known capacity and being alternately filled and emptied without other aid than that described, any quantity of water the cistern is capable of holding may be measured with accuracy.

In all cases the siphons, conduits, and valves must be large enough to pass a rather larger quantity of water in a given time than that flowing from the supply-pipe. In other words, the siphon or valve must be large enough to admit of the chamber being emptied before the funnel L returns to it again to fill it.

Although water is the only liquid hereinbefore mentioned, meters made as described are equally suitable for measuring many other liquids.

Having now described and ascertained the nature of my invention and the manner in which the same may be performed, I desire it to be understood that what I claim is—

1. The box A, divided into two equal parts, in combination with the siphon-tubes F G, arranged one in each chamber, the service-pipe E, the funnel-conduit L, and the pivotally-mounted beam N, having a gravity-weight and connected with arms K, attached to the conduit L, substantially as described.

2. The combination, with the box A, divided by a central partition, of the conduit L, the service-pipe discharging therein, the weighted beam N, having cups on each end, a pipe within each compartment of box A, which at a given point discharges into one of the cups on the beam N, and a registering mechanism operated by the oscillation of the said beam, substantially as described.

3. The combination, with the box A, divided by a central partition, of the oscillating conduit L, the weighted beam N, connected to and moved by said beam, cups mounted upon said beam, pipes arranged within the compartments of the box and discharging into said cups, a register operated by the oscillation of the beam, and a discharge-valve in each compartment opened and closed by the beam N, substantially as described.

4. The combination, with the box A, divided into two compartments, of the oscillating conduit L, the stand-pipe E, the box R, attached to the discharge-pipe, the pipe S within said box, the siphon T, discharging into said pipe, the weighted beam N, having perforated cups upon each end, rods connecting the oscillating conduit to the beam N, a register operated by the latter, and discharge-pipes in the compartments of the box A, substantially as described.

WILLIAM COWAN.

Witnesses:
 CHARLES K. LAING,
 GEORGE F. WELSH.